No. 846,918. PATENTED MAR. 12, 1907.
L. FRANZMEIER.
HARVESTER ATTACHMENT.
APPLICATION FILED OCT. 16, 1905.
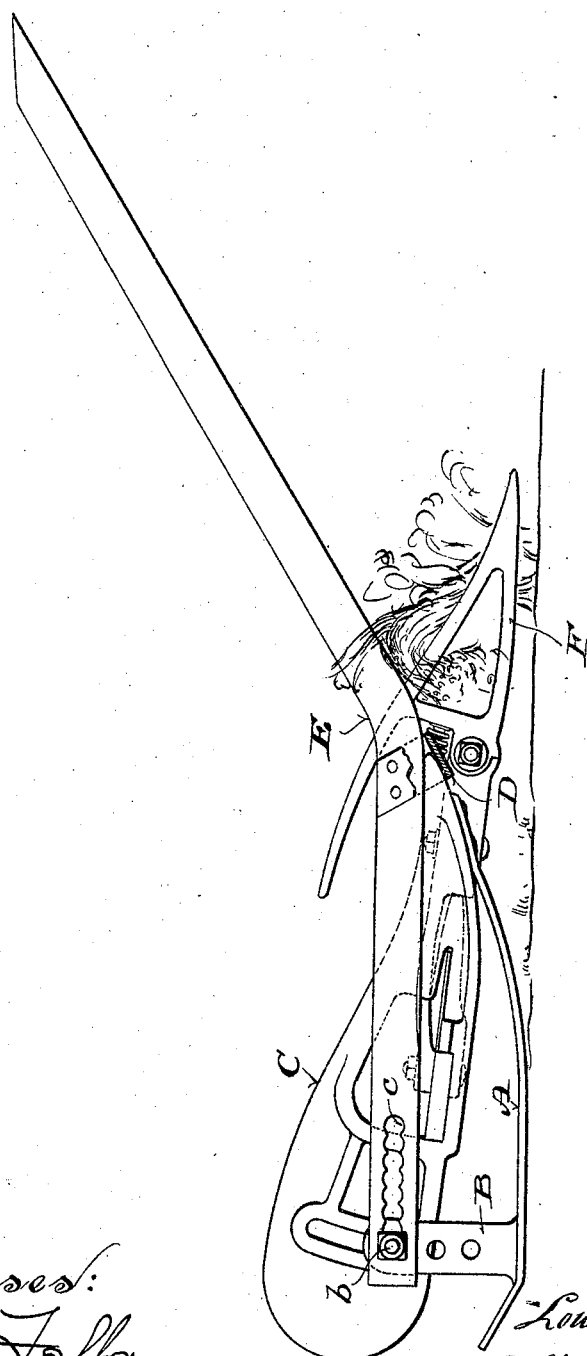

UNITED STATES PATENT OFFICE.

LOUIS FRANZMEIER, OF NEWTON, WISCONSIN.

HARVESTER ATTACHMENT.

No. 846,918.  Specification of Letters Patent.  Patented March 12, 1907.

Application filed October 16, 1905. Serial No. 282,919.

*To all whom it may concern:*

Be it known that I, LOUIS FRANZMEIER, a citizen of the United States, and a resident of Newton, in the county of Manitowoc and State of Wisconsin, have invented certain new and useful Improvements in Harvester Attachments; and I do hereby declare that the following is a full, clear, and exact description thereof.

My invention consists in a device similar to what is hereinafter particularly set forth with reference to the accompanying drawing and subsequently claimed, its object being to provide simple economical attachments for harvesters, these attachments being designed to insure cut of lodged grain or pulse-vines adjacent to the dividers of the cutting apparatus of said harvesters.

The drawing represents a side elevation of the cutting apparatus of a harvester provided with an attachment in accordance with my invention, this attachment being partly broken away.

Referring by letter to the drawings, A indicates the shoe, B the shoe-standard, and C the divider, of a harvester cutting apparatus. Engaged by the point of the divider is a tapered socket-clip D, fast on a single-bend bar E, immediately in rear of the bend of same, as is herein shown. The upper portion of the bar is at an obtuse angle to the remainder of same and its rise begins at the point of the socket portion of the clip. That portion of the bar extending back of the clip is apertured at the rear to be engaged by the bolt *b*, on which the slotted divider C has adjustable connection with the shoe-standard B, and the aperture is preferably a slot *c* longitudinally of said bar. Being provided with the slot, the bar is adjustable to accommodate the same to shoes of various lengths, the edges of the slots being preferably corrugated to prevent slipping on the bolt aforesaid.

The single-bend bar and the socket-clip in rigid connection therewith to partly depend therefrom immediately in rear of the bend of same constitute a harvester attachment in accordance with my invention.

Attachments F, similar to the one set forth in my Patent No. 728,561, of May 19, 1903, are now generally employed in connection with the cutting apparatus of a harvester to raise lodged grain or other material to be cut, and the other attachment herein specified operates to press down upon said material thus elevated and insure of the same being cut adjacent to the divider, none of said material being left uncut in the lines of demarcation between cut and uncut stalks throughout a field in which the harvester is operated, as would be the case were there a bend of the bar portion E of the latter attachment below and forward of the socket-clip D, engaged by the point of the divider C of said harvester.

I claim—

1. The combination with a harvester-shoe having a standard and divider, of an attachment consisting of a single-bend bar provided with a rigid taper socket-clip immediately in rear of the bend of same for the engagement of the point of said divider, the rear end of the bar being in connection with said standard and the forward portion of said bar inclined upward at an obtuse angle to the remainder thereof ahead of the clip.

2. The combination with a harvester-shoe having a standard and divider, of an attachment consisting of a single-bend bar that is longitudinally slotted at the rear end, a rigid taper socket-clip provided in connection with the bar immediately in rear of the bend of same for the engagement of the point of said divider, and a fastening-bolt engaging said standard and the slot of said bar, the forward portion of which bar is inclined upward at an obtuse angle to the remainder thereof ahead of the clip.

In testimony that I claim the foregoing I have hereunto set my hand, at Manitowoc city, in the county of Manitowoc and State of Wisconsin, in the presence of two witnesses.

L. FRANZMEIER.

Witnesses:
 FRANK ZEMAN,
 R. H. MARKHAM.